United States Patent
Jarlstrom et al.

(10) Patent No.: US 9,268,947 B1
(45) Date of Patent: Feb. 23, 2016

(54) METHOD AND SYSTEM FOR MANAGING INFORMATION ASSOCIATED WITH SENSITIVE INFORMATION IN AN ENTERPRISE

(71) Applicant: Dataguise Inc., Fremont, CA (US)

(72) Inventors: Erik Jarlstrom, Redwood City, CA (US); Subramanian Ramesh, San Jose, CA (US)

(73) Assignee: Dataguise Inc., Fremont, CA (US)

( * ) Notice: Subject to any disclaimer, the term of this patent is extended or adjusted under 35 U.S.C. 154(b) by 0 days.

(21) Appl. No.: 13/834,070

(22) Filed: Mar. 15, 2013

Related U.S. Application Data

(60) Provisional application No. 61/611,420, filed on Mar. 15, 2012.

(51) Int. Cl.
*G06F 21/00* (2013.01)
*G06F 21/60* (2013.01)

(52) U.S. Cl.
CPC ...................................... *G06F 21/60* (2013.01)

(58) Field of Classification Search
CPC combination set(s) only.
See application file for complete search history.

(56) References Cited

U.S. PATENT DOCUMENTS

| 8,407,194 B1* | 3/2013 | Chaput et al. | 707/694 |
|---|---|---|---|
| 2011/0173676 A1* | 7/2011 | Peckover | 726/3 |

\* cited by examiner

*Primary Examiner* — Ghazal Shehni
(74) *Attorney, Agent, or Firm* — Timberline Patent Law Group PLLC

(57) ABSTRACT

The present invention provides a method and system for providing a view of sensitive information across an enterprise. The method includes finding locations of data stores across the enterprise and thereafter searching for sensitive information within the data stores, based on policies. Upon identifying the sensitive information, the sensitive information is optionally quarantined, masked, or encrypted, again based on policies. Information about the locations of the data stores, the sensitive information associated with the data stores, and the masking steps taken, is saved in a repository, and can be tagged. A user may then query the repository to retrieve one or more views of the sensitive information, gaining an overview of the compliance posture of the enterprise relative to one or more data compliance regulations, and for potential data exposure risk areas be able to drill down for actionable level of details.

20 Claims, 2 Drawing Sheets

METHOD AND SYSTEM FOR MANAGING INFORMATION ASSOCIATED WITH SENSITIVE INFORMATION IN AN ENTERPRISE

CROSS REFERENCE

This utility application claims the benefit of U.S. Provisional Application Ser. No. 61/611,420, filed Mar. 15, 2012, having the title "METHOD AND SYSTEM FOR REPORTING ON ENTERPRISE DATA SECURITY", the entire contents of which are incorporated herein by this reference.

FIELD OF THE INVENTION

The present invention generally relates to providing a global view of sensitive information across an enterprise. More specifically, the present invention relates to a method and system for reporting on the sensitive information in one or more user customizable views.

BACKGROUND OF THE INVENTION

Securing sensitive information is an important concern for any enterprise or organization. The sensitive information may be scattered in different data stores across the enterprise, such as databases, flat files, directories, unstructured data stores, and semi-structured data stores. As a result of the distributed nature of data within an enterprise, it is difficult to identify which data stores contain sensitive information and what measures have been employed to protect this sensitive information.

It is imperative that a user have an aggregate view of the presence and security of the sensitive information across an enterprise. This aggregate view needs to be tied to business attributes within the enterprise, for easy classification, analysis, and remediation. Example business attributes may be regions where the enterprise operates, departments such as Engineering, Human Resources, and Finance, or divisions based on product areas. The enterprise-wide aggregate view needs to be further augmented with details that go deeper into where the sensitive information was found, what the nature of the sensitive information was, and what actions were taken to secure it.

There are many methods that can be adopted to protect sensitive information in an enterprise. For example, certain transformations can be applied to particular data types within databases. Other transformations or permissions controls may be applied for flat files. In order to have uniform corporate level conformance, it is important that a single set of policies be applied for each type of data that needs to be protected.

Therefore, there is a need for a method and system for providing a global view of sensitive information across an enterprise. Also, there is a need for a method and system for reporting on sensitive information along with business attributes associated with the sensitive information. There is also a need for a global method of setting policies for protecting different types of sensitive data.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
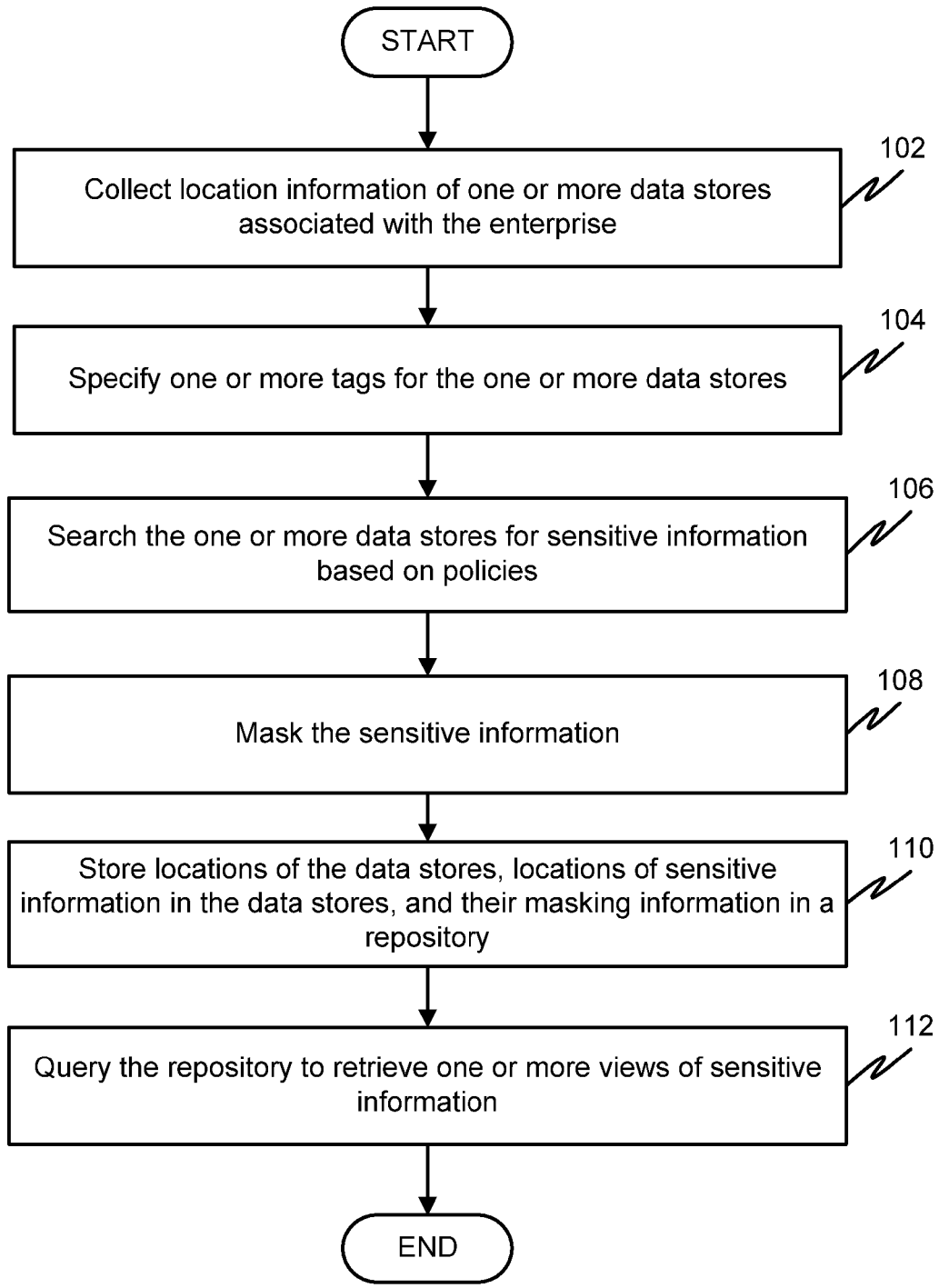
FIG. 1 illustrates a flow diagram of a method of managing information associated with sensitive information of an enterprise.

As required, embodiments of the invention are disclosed herein; however, it is to be understood that the disclosed embodiments are merely exemplary of the invention, which can be embodied in various forms. Therefore, specific functional details disclosed herein are not to be interpreted as limiting, but merely as a representative basis for teaching one skilled in the art to variously employ the invention in virtually any appropriately detailed structure. Further, the terms and phrases used herein are not intended to be limiting but rather to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Before describing in detail embodiments that are in accordance with the present invention, it should be observed that the embodiments reside primarily in combinations of method steps and apparatus components related to method and system for reporting sensitive information across an enterprise. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Information associated with an enterprise is typically stored across multiple data stores. The multiple data stores can be one or more of, but not limited to, a database, a distributed file system, a non-distributed file system and a content management system. Further, some of the information in each or at least a few of the multiple data stores can be sensitive. The invention tracks and maintains information about the location of the multiple data stores and information associated with sensitive information stored within the multiple data stores. The information associated with the sensitive information can include, but is not limited to, information about the location of the sensitive information, information about actions such as, but not limited to, discovery, masking, encryption, and quarantining, executed on the sensitive information, and information about one or more policies associated with identifying and treating the sensitive information. The information about the data stores and the sensitive information is used for management of the sensitive information. For example, a user interested in finding out where the sensitive information of the user's enterprise is located in the data stores can be provided with said information based on the access rights and privileges of the user. Further, information associated with the actions performed on the sensitive information can be provided to the user. In addition, the policies associated with the sensitive information can be provided to the user. The user can also attach tags indicating additional details (business-level or other) to the information about the sensitive information. The information can be provided in a wide variety of ways. For example, a global view of information associated with the sensitive information spread across the multiple data stores can be provided. Alternately, the view can be limited to the information associated with the sensitive information stored on a particular data store on an element of a particular data store. The view also can be provided according to policies for storing sensitive information or tags associated with data stores. Further, options can be provided for navigating through the information associated with sensitive information of the enterprise according to the access rights and privileges. For instance, a user can initially be provided with a global view of the information associated with the sensitive information of the enterprise and can be allowed to drill down to a specific view according to the user's preference. For example, the user may want to drill down to a data store specific view or a policy specific view.

Various embodiments of the invention provide a method and system for managing information associated with sensitive information of an enterprise. In accordance with the various embodiments, the sensitive information comprises a plurality of sensitive data items. In order to facilitate management of the information associated with the sensitive information, a repository is maintained.

In accordance with various embodiments, the repository comprises information about location of a plurality of data stores associated with the enterprise; wherein each of the plurality of data stores can be one of, but not limited to, a database, a distributed file system, a non-distributed file system and a content management system. The repository further comprises information about location of each sensitive data item in the plurality of data stores. The information about the location of each sensitive data item is stored in the repository based on a search performed on each of the plurality of data stores for the sensitive information. In addition, the repository comprises information about one or more actions executed on each sensitive data item of the plurality of sensitive data items. Moreover, the repository comprises information associated with one or more policies associated with the sensitive information. The one or more policies can be policies defined for identifying and treating sensitive data in a variety of data stores. For example, actions such as discovery, masking, encryption and quarantining of sensitive data within said data stores can be executed based on the policies defined. The original policy applied can be tied with the results of the actions performed using that policy. This information can also be stored in the repository and used for reporting the results of such actions on elements of the data store at a fine level of granularity such as for example columns within tables, or lines and offsets within files within a file system. Elements in data stores can also be associated with one or more business tags describing but not limited to, the business purpose, geographical region, department, or business unit relevant to the elements of each data store, for example tables of a database, or files in a file system. Further, the tags can be assigned either manually or automatically based on the data or metadata of the corresponding elements. The repository also comprises information about one or more tags associated with one or more elements of one or more data stores. Each of the one or more elements can be one of, but not limited to, a table of a database and a file of one of a distributed file system and a non-distributed file system. In accordance with the embodiment, the one or more tags comprise information for identifying content stored in the one or more elements.

In accordance with the various embodiments, the method comprises receiving a request for accessing the information associated with the sensitive information. The method further comprises querying the repository based on the request to retrieve the information associated with the sensitive information. In addition, the method comprises rendering the information associated with the sensitive information of the enterprise based on the information retrieved from the repository.

In an embodiment, the request comprises information associated with one or more policies for retrieving the sensitive information corresponding to the one or more policies. For example, a user may be interested in viewing information corresponding to a Personally Identifiable Information (PII) policy. In accordance with the embodiment, the method for rendering the information comprises displaying the information associated with the sensitive information based on the one or more policies.

In an embodiment, the request comprises information associated with one or more tags for retrieving the sensitive information corresponding to the one or more tags. In accordance with the embodiment, the method comprises displaying the information associated with the sensitive information based on the one or more tags.

In an embodiment, the method comprises aggregating the information about the plurality of sensitive data items and the actions performed on the plurality of sensitive data items. In accordance with the embodiment, the method further comprises displaying the aggregated information. The aggregated information can be displayed according to one or more policies. The aggregated information can also be displayed according to one or more tags associated with one or more elements of one or more data stores.

In an embodiment, the method comprises displaying the information associated with a set of sensitive data items of the plurality of sensitive data items stored on one or more elements of one or more data stores. The information associated with the set of sensitive data items comprises information about location of each sensitive data item of the set of sensitive data items and one or more actions performed on each sensitive data item of the set of sensitive data items.

In an embodiment, the method comprises notifying one of an external system or user about the information associated with the sensitive information of the enterprise.

In an embodiment, the method comprises providing one or more views of the sensitive information in the data store. The view can be customized based on access rights of a user, wherein the user provides the request for accessing the information associated with the sensitive information of the enterprise.

In accordance with various embodiments, the system comprises a plurality of data stores, wherein each of the plurality of data stores is configured to store information associated with the enterprise. The system also comprises a collection module configured to collect information associated with each of the plurality of data stores, wherein the collection module comprises a locate module configured to determine location of each of the plurality of data stores. The collection module further comprises a search module configured to identify sensitive information associated with the plurality of data stores. The collection module can also comprise a masking module configured to mask the sensitive information. In addition, the collection module can comprise an encryption module configured to encrypt the sensitive information. Further, the collection module can comprise a quarantine module configured to quarantine the sensitive information. The system further comprises a reporting database configured to store information corresponding to the sensitive information. In addition, the system comprises a dashboard configured to receive a query associated with the sensitive information. The dashboard is also configured to render the information corresponding to the sensitive information in response to the query.

Various embodiments of the invention also provide methods and systems for providing a view of sensitive information across an enterprise. The method includes identifying locations of data stores across the enterprise, and thereafter searching for sensitive information within the data stores. On identifying the sensitive information, the sensitive information is optionally masked, quarantined or encrypted. Information about the locations of the data stores, the sensitive information associated with the data stores, and the masking steps taken, is saved in a repository. A user may query the repository to retrieve one or more views of the sensitive information.

FIG. 1 illustrates a flow diagram of a method of managing information associated with sensitive information of an enterprise in accordance with an embodiment of the invention. At step 102, location information of one or more data stores (hereinafter referred to as "data stores") across the enterprise is collected. In an embodiment, a data store may be a database, a distributed file system, a non-distributed file system, a content management system. For example, the data store can be a highly distributed file system such as Hadoop distributed file system. An administrator may manually specify the locations of the data stores, or the location information may be determined automatically. For example, the locations of the data stores may be automatically determined by scanning techniques, or from database entries of administrators or from other enterprise documentation.

Once the location information about the data stores is collected, the administrator may specify one or more tags for each data store at step 104. The tags associated with a data store provide additional information about the data store or about the content within the data store. A data store may be tagged with information such as, but not limited to, region information, sub-entities such as departments of the enterprise responsible for the data store, and functional purpose of the data store (for example, Payroll, HR, Marketing, etc).

In an embodiment, the data stores may be annotated with one or more tags automatically. To achieve this, historical data related to a data store may be used to automatically define one or more tags. For example, an Internet Protocol (IP) address of a data store may indicate that it belongs to a particular sub-entity of the enterprise. Accordingly, the data store may be automatically tagged as belonging to that sub-entity or as having content associated with that sub-entity. Additionally or alternatively, one or more tags may be attached to specific columns or cells within the data store (if the data store is a database.) If the data store is a file server, tags may be attached to specific files or directories.

At step 106, the data stores are searched for sensitive information. Sensitive information associated with the data stores may be identified based on one or more data elements within columns of database tables; one or more policies specified at the corporate level, one or more regular expression patterns within the documents or the files, or other heuristics. The regular expressions deemed sensitive may be specified by the administrator through an administration and policy console, and/or may be in line with security standards set for information protection. These security standards may include Payment Card Industry Data Security Standard (PCI DSS), Personally Identifiable Information (PII) standards, and Health Insurance Portability and Accountability Act (HIPAA) privacy rules. As an example, an administrator may define a policy that all items such as tables, columns, documents and files of the data stores having a pattern matching a Social Security Number (SSN) are to be considered sensitive.

After searching the data stores to locate sensitive information, at step 108, the sensitive information may be masked. Masking of the sensitive information may be done to prevent exposure of the sensitive information and to comply with security policies such as PCI DSS, PII, and HIPAA. For example, for compliance with PCI DSS requirements, an organization is required to protect stored cardholder data and restrict access to cardholder data by business need-to-know. To implement this, sensitive information needs to be masked in a data store which accessible by personnel without the required authorization for the sensitive content. A typical scenario is when an application used for conducting financial transactions is to be tested. To test the application, a copy of a current production database with a large number of credit card numbers and names of credit card holders may be required. However, passing such information to the testing team may be a security breach and may result in non-compliance with security policies. In such cases, the raw data corresponding to the credit card numbers and credit card holders is masked before being provided to the testing team. Masking in this case may involve replacing the original data with realistic but not real data while maintaining the format of the original data. Metadata about the masked data items may contain information such as, but not limited to, source of the data item, type of masking applied and date of the masking. Metadata about the masked data items may be in the form of a watermark and is used in reporting on the sensitive information as will be described later. It is to be understood that the masking technique disclosed herein is exemplary and that other techniques such as encryption may also be used to protect the sensitive information.

At step 110, information corresponding to the locations of the data stores and information corresponding to the sensitive information within the data stores is stored in a repository. Additionally, tags associated with one or more of the data stores and with the sensitive information within the data stores are also stored in the repository. Further, the metadata about the masked data items are also saved in the repository. The repository may be refreshed automatically on a periodic basis, or based on user input, to reflect the latest information corresponding to the data stores. Thereafter, at step 112, the repository may be queried to report on sensitive information across the enterprise. Reporting on the sensitive information includes providing one or more views about the nature of the sensitive information. The reporting provides a view of a location containing the sensitive information. In the case of databases, the location may include, but need not be limited to, IP address, database name, table name and column name of the one or more data stores that contain sensitive information. In the case of files and other non-database data stores, the location may include, but not be limited to, directory location, file name, and structure of the files of the one or more data stores that contain sensitive information. The one or more views may be customized according to the needs of an end user.

For querying the repository, a user interface such as, but not limited to, a dashboard may be used. The dashboard provides an overall security view of the enterprise. A user may use the dashboard to query the repository for one or more views of sensitive information. The query of the user is matched against the information in the repository and accordingly, a view corresponding to the query is presented to the user. For example, the user may choose to view the sensitive information across all data stores in terms of compliance with various security policies. In this view, the sensitive information across the enterprise is displayed and the percentage of sensitive information that is in compliance and that not in compliance with the different security policies is displayed. Further, the user may drill down to a view of all the locations of the sensitive information corresponding to a particular security policy. As one alternative, users may be able to view by data stores such as databases and files, sensitive data information related to the respective data store. Different users may be able to view and drill down to different subsets of the information based on their privileges or roles.

Further, status of the one or more data stores containing the sensitive information in the enterprise may be indicated when reporting on the sensitive information. Status of the data stores containing the sensitive information may indicate measures adopted to protect the sensitive information and the type of encryption or masking, if any, used to protect the sensitive information. For example, if the metadata of a data store does not indicate any type of encryption or masking, then the data store may be identified as a potential security risk. If a data store containing sensitive information is not protected, guidelines to secure the data store may be provided.

Additionally, an administration and policy console may be used to set security policies for information across the enterprise. For example, a set of patterns that will identify sensitive information as defined by the Payment Card Industry Data Security Standards (PCI DSS) may be created. A set of masking operations for these patterns that will remove the exposure of sensitive data per PCI DSS will also be defined. These policies may be saved in a repository associated with the administration and policy console and re-used to find and mask future sensitive information.

In an exemplary embodiment, a Human Resources manager in the European region of a multinational enterprise may maintain several databases related to employees. The employee databases may also include information regarding personal details, pay scale, performance evaluation, etc. These employee databases are production databases, which are in the protected, production subnet of the multinational enterprise. The production databases are accessed only by authorized personnel. For testing purposes, for example, a department may decide to create a copy of these employee databases and locate the copies in a Quality Assurance (QA) department in the European Region, which does not have the same level of network protection as the production subnet. Before relocation of the copies to the QA department takes place, a discovery and search operation is run on the copies, and sensitive information associated with these copies is identified. Then, the sensitive information can be masked. Subsequently, the copies can be transferred to the QA department. In the QA department, the discovery and search operations for sensitive information can again be run in order to make sure that there is no unmasked sensitive information. All the information such as the location of the copies containing the sensitive information, status of the sensitive information can be captured and stored in a repository. Attributes to group databases such as by region, division, function etc. are applied for easy tracking. In this example, Europe is the region, HR the division and QA the function. This ensures a complete view of the sensitive information for the European Region's security officer. The security officer may then ascertain whether the sensitive information associated with the QA department is safe. Further, the security officer can see if the production subnet has been searched for the sensitive information. If a search has not recently been done then the security officer can ask a person in charge of the production subnet to do the search. In addition to the European region's security officer, a Chief Information Security Officer (CISO) of the enterprise can also identify an exposure in the European region's employee database and can contact the European region's security officer to take appropriate action.

In an embodiment, access to particular sensitive information may be based on a role of an end user. For example, for an end user such as a Chief Information Security Officer (CISO), an overall view of sensitive information across the entire enterprise may be provided. The overall view may contain sensitive information of all departments across the entire enterprise and location information of the sensitive information. Another end user may be a security officer of a particular department who will be provided with a view of the location of all of the sensitive information pertaining to that department. The department may be broken down into sub-entities or regions associated with that department. There may be another end user who may be a person in charge of a particular database containing sensitive information. The view provided to this person will be the location information of the sensitive information associated with that database.

Figure 2:
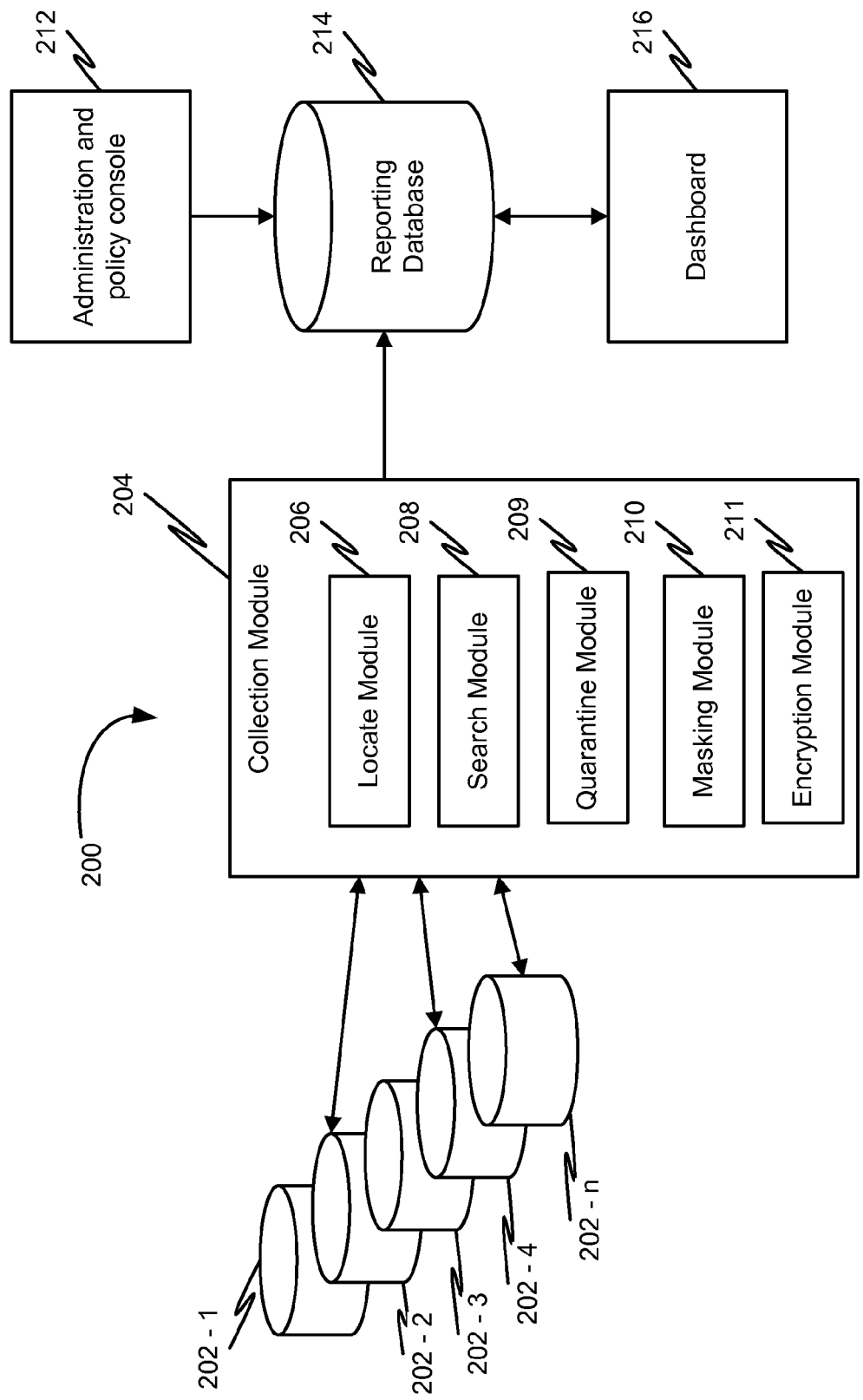
FIG. 2 illustrates a schematic diagram of a system for of managing information associated with sensitive information of the enterprise in accordance with an embodiment of the invention.

FIG. 2 illustrates a schematic diagram of a system 200 for managing information associated with the sensitive information of the enterprise in accordance with an embodiment of the invention. System 200 includes one or more data stores such as data stores 202-1 to 202-$n$ associated with the enterprise. Data stores 202-1 to 202-$n$ store information associated with the enterprise. System 200 further includes a collection module 204 to collect information associated with data stores 202-1 to 202-$n$. Collection module 204 includes a locate module 206, a search module 208, a quarantine module 209, a masking module 210, and an encryption module 211. Locate module 206 automatically determines locations of data stores 202-1 to 202-$n$ from database entries of administrators or from other enterprise documentation. Alternatively, an administrator may specify a location of each of data stores 202-1 to 202-$n$ through a user interface such as an administration and policy console 212. Further, the administrator may specify one or more tags for each of data stores 202-1 to 202-$n$ through administration and policy console 212. The tags associated with a data store provide additional information about the data store or the content within the data store. A data store may be tagged with information such as, but not limited to, region information, sub-entities such as departments of the enterprise responsible for the data store (for example, Payroll, HR, Marketing, etc), and functional purpose of the data store (for example, Development, Quality Assurance, Analytics etc). Further, system 200 may also include a tag insertion module (not shown in FIG. 2) to automatically tag the data stores as explained in conjunction with FIG. 1. The information corresponding to the locations of data stores 202-1 to 202-n and the tags associated with each of data stores 202-1 to 202-n is stored in a reporting database 214.

Collection module 204 further include search module 208 to identify sensitive information associated with data stores 202-1 to 202-n. Sensitive information associated with data stores 202-1 to 202-n may be identified based on one or more data items within columns of database tables, one or more policies defined at the corporate level, one or more regular expression patterns within the documents or the files, or other heuristics. The regular expressions deemed sensitive may be specified by the administrator through administration and policy console 212 and/or may be in line with security standards set for information protection. These security standards may include Payment Card Industry Data Security Standard (PCI DSS), Personally Identifiable Information (PII) standards, and Health Insurance Portability and Accountability Act (HIPAA) privacy rules.

Once search module 208 identifies sensitive information in data stores 202-1 to 202-n, quarantine module 209 may be used to isolate the data store or elements within from general access, masking module 210 may be used to mask the sensitive information to prevent exposure of the sensitive information and to comply with security policies such as PCI DSS, PII, and HIPAA as explained in conjunction with FIG. 1. Metadata about the masked data items may contain information such as, but not limited to, source of the data item, type of masking applied and date of the masking. Alternatively, encryption module 211 may be used to encrypt the sensitive data.

Although system 200 illustrates a single collection module 204, it is to be understood that this is for the sake of clarity and more than one collection module similar to collection module 204 may be associated with system 200. For example, if the enterprise is spread across a number of locations, each location may be associated with a collection module. Depending on the nature of the data store, the individual modules for search, quarantine, masking, and encryption may be configured to run either outside or inside the data store.

Information corresponding to the sensitive information within data stores 202-1 to 202-n is then stored in reporting database 214. Further, metadata about the masked data items are also saved in reporting database 214. A user may query reporting database 214 using a dashboard 216 to get an enterprise wide view of the sensitive information as explained in conjunction with FIG. 1.

In addition to retrieving a view of the one or more sensitive information in the enterprise, the one or more data stores containing sensitive information which is not secured or protected may be indicated on dashboard 216. For example, if the metadata of a database column does not indicate any type of encryption or masking, then the database column may be identified as a potential security risk. If a database is not protected, guidelines to secure the sensitive document may be provided.

Various embodiments of the invention provide methods and systems for providing a view of sensitive information across an enterprise. The reporting of sensitive information across an enterprise along with secondary information about the sensitive information simplifies the management of sensitive data across the enterprise. Additionally, by providing information as to whether sensitive information is adequately protected or not, it allows an administrator to identify vulnerable sensitive information and employ security policies accordingly. Further, security policies for data across the enterprise from an administration and policy console may be verified for compliance across the enterprise.

Those skilled in the art will realize that the above-recognized advantages and other advantages described herein are merely exemplary and are not meant to be a complete rendering of all of the advantages of the various embodiments of the invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A system for displaying an aggregate view of data security across an enterprise, the system comprising:
    a plurality of data stores, wherein each of the plurality of the data stores is configured to store information associated with the enterprise;
    a secure reporting database configured to store locations of the plurality of the data stores within the enterprise, an address of each identified sensitive datum within each of the plurality of the data stores, and security attributes of the each identified sensitive datum with respect to the stored locations and the stored address of the each identified sensitive datum; and
    a dashboard configured to display the aggregate view of the data security across the enterprise to a user in response to a query of the stored locations, the stored address, and the stored security attributes in the secure reporting database.

2. The system of claim 1, wherein the aggregate view displays a percentage of secured data across the enterprise in relation to a percentage of sensitive data across the enterprise.

3. The system of claim 1, wherein the aggregate view maps the types of security measures applied to the each identified sensitive datum across the enterprise.

4. The system of claim 1, wherein the aggregate view maps the each identified sensitive datum by the location of the each corresponding data store, by a department of the enterprise, by a division of the department of the enterprise, or with respect to a product of the enterprise.

5. The system of claim 1, wherein the aggregate view maps the each identified sensitive datum accessible to the user based on access rights or a privilege of the user.

6. The system of claim 1, wherein the aggregate view displays the location of the each identified sensitive datum corresponding to a particular security policy of the enterprise.

7. A method for displaying an aggregate view of data security across an enterprise, comprising:
    determining locations of data stores within the enterprise;
    storing the locations of the data stores in a secure reporting database;
    identifying each sensitive datum within each of the data stores;

storing an address of the each sensitive datum with respect to the each corresponding data store, each address stored in the secure reporting database;

for the each sensitive datum, recording security attributes of the each sensitive datum in the secure reporting database with respect to the stored locations and the stored address of the each sensitive datum;

generating a query related to a security of sensitive data of the enterprise;

querying the secure reporting database, comprising applying the query to the security attributes of the each sensitive datum stored in the secure reporting database;

receiving locations and addresses returned by the query;

aggregating the locations and the addresses returned by the query into a the aggregate view of the data security across the enterprise, the aggregate view responding to the query; and displaying the aggregate view of the data security across the enterprise to a user in response to the query.

8. The method of claim 7, further comprising periodically re-identifying the each sensitive datum in the each data store and refreshing the locations, the addresses, and the security attributes in the secure reporting database.

9. The method of claim 7, wherein the aggregate view displays a percentage of sensitive data across the enterprise.

10. The method of claim 7, wherein the aggregate view displays a percentage of secured data across the enterprise in relation to a percentage of sensitive data across the enterprise.

11. The method of claim 7, wherein the aggregate view maps the types of security measures applied to the each sensitive datum across the enterprise.

12. The method of claim 11, wherein the aggregate view maps a location of the each sensitive datum protected by a particular type of security measure across the enterprise.

13. The method of claim 7, wherein the aggregate view maps the each sensitive datum by a location of the each corresponding data store, by a department of the enterprise, by a division of the department, or with respect to a product of the enterprise.

14. The method of claim 7, wherein the aggregate view maps the each sensitive datum accessible to the user based on access rights or a privilege of the user.

15. The method of claim 7, wherein the aggregate view displays a location or a percentage of unprotected sensitive data across the enterprise.

16. The method of claim 7, wherein the aggregate view displays a degree of relative sensitivity of the each sensitive datum across the enterprise.

17. The method of claim 7, wherein the aggregate view displays a location of the each sensitive datum corresponding to a particular security policy of the enterprise.

18. The method of claim 7, wherein the query includes a security compliance criterion.

19. The method of claim 7, further comprising masking an identified sensitive datum.

20. The method of claim 7, wherein identifying the each sensitive datum includes applying a heuristic selected from the group consisting of a policy established at a corporate level, an expression pattern within a document, a Payment Card Industry Data Security Standard (PCI DSS), a Personally Identifiable Information (PII) standard, a Health Insurance Portability and Accountability Act (HIPAA) privacy rule, and a Social Security Number (SSN) pattern.

\* \* \* \* \*